United States Patent
Aoki

(10) Patent No.: US 6,357,411 B1
(45) Date of Patent: Mar. 19, 2002

(54) INTAKE DEVICE FOR INTERNAL COMBUSTION ENGINES

(75) Inventor: Masahiro Aoki, Hamamatsu (JP)

(73) Assignee: Suzuki Motor Corporation (JP)

( * ) Notice: Subject to any disclaimer, the term of this patent is extended or adjusted under 35 U.S.C. 154(b) by 0 days.

(21) Appl. No.: 09/474,271

(22) Filed: Dec. 29, 1999

(30) Foreign Application Priority Data

Dec. 29, 1998 (JP) .......................................... 10-377543

(51) Int. Cl.⁷ .............................................. F02M 35/10
(52) U.S. Cl. ........................... 123/184.24; 123/184.34; 123/184.42; 123/184.47
(58) Field of Search ....................... 123/184.21, 184.24, 123/184.34, 184.42, 184.47

(56) References Cited

U.S. PATENT DOCUMENTS

| | | | |
|---|---|---|---|
| 4,318,371 A | * 3/1982 | McFarland | 123/184.35 |
| 5,379,735 A | * 1/1995 | Ma | 123/184.42 |
| 5,551,387 A | * 9/1996 | Carter et al. | 123/184.42 |
| 6,142,114 A | * 11/2000 | Yoshikawa | 123/184.42 |

* cited by examiner

Primary Examiner—Willis R. Wolfe
Assistant Examiner—Hai Huynh
(74) Attorney, Agent, or Firm—Morrison Law Firm

(57) ABSTRACT

Branching pipes connect a surge tank to an intake manifold of an internal combustion engine. The branching pipes are made such that each gas column of the internal combustion receives a uniform intake volume. This is achieved by either making each branching pipe of the same length, or by adjusting the inside diameters of the branching pipes, thereby creating a flow delay of the intake into the gas columns, resulting in uniform intake volume. The inside diameters of the branching pipes are either made uniformly of a different diameter, or, alternatively, the inside diameters of the branching pipes include throttles for reducing the diameter of the branching pipe at a localized portion. In both cases, a flow delay of the intake into the gas columns is compensated, resulting in a uniform intake volume. The branching pipes of the present invention result in an improved output performance for the internal combustion engine; provide for smooth branching paths; reduce intake resistance; allow the intake manifold to be made compact and light; reduce fuel consumption; improve power performance; allow the internal combustion engine to be made compact; allow easier mounting in automobiles; and allow automobiles to be lighter.

16 Claims, 14 Drawing Sheets

PRIOR ART

INTAKE DEVICE FOR INTERNAL COMBUSTION ENGINES

BACKGROUND OF THE INVENTION

The present invention relates to an intake device for internal combustion engines. More specifically, the present invention relates to an intake device for internal combustion engines that allows the lengths of branching paths to be uniform, thereby improving output performance of the internal combustion engine. Additionally, the present invention relates to an intake device for internal combustion engines having smooth branching paths, thereby reducing intake resistance. The present invention relates to an intake device for internal combustion engines having a more compact and lightweight intake manifold, thereby reducing fuel consumption and improving power performance. Finally, the present invention relates to an intake device for internal combustion engines having a more compact internal combustion engine, thereby improving ease of mounting in an automobile and making the automobile lighter.

In conventional internal combustion engines mounted in cars, an intake device is disposed to guide intake gas into a plurality of gas columns. In this conventional intake device, there is an intake manifold that guides the intake gas to the gas columns. A throttle body adjusts the air intake.

Referring to FIG. 16, an internal combustion engine 202, mounted in an automobile (not shown), includes a cylinder block 204 having an oil pan 210. A cylinder head 206 is covered by a head cover 208. In this conventional internal combustion engine 202, a plurality of gas columns, e.g., four gas columns numbers 1–4 (not shown in the figure), are arranged in a row. An intake device 212 is positioned at cylinder head 206.

Air intake device 212 includes a throttle body 214 and an intake manifold 216. Throttle body 214 adjusts air intake using an internal throttle valve (not shown in the figure). Intake manifold 216 guides intake gas to the gas columns.

Referring to FIG. 17, an attachment flange 218 attaches to cylinder head 206. First through fourth branching pipes 220-1–220-4 correspond to the first through fourth gas columns numbers 1–4. A surge tank 222 restricts intake gas ripples.

Surge tank 222 is positioned at a gas column row center C along a gas column row direction D formed by the four gas columns numbers 1–4 of internal combustion engine 202. The ends of first through fourth branching pipes 220-1–220-4 connect to attachment flange 218. The other ends of first through fourth branching pipes 220-1–220-4 connect to surge tank 222.

With this conventional intake manifold 216, first and second branching pipes 220-1 and 220-2 connect to attachment flange 218 on one side of gas column center C along gas column row direction D. The other end of first and second branching pipes 220-1 and 220-2 connect to a side wall 224 of surge tank 222 facing one side of gas column direction D. Also, in intake manifold 216, third and fourth branching pipes 220-1 and 220-2 connect to attachment flange 218 on the other side of gas column center C along gas column row direction D. The other end of third and fourth branching pipes 220-3 and 220-4 connect to an opposite side wall 226 of surge tank 222, facing the other side of gas column direction D.

Thus, with conventional intake manifold 216, first through fourth branching pipes 220-1–220-4 are disposed symmetrically around gas column row center C, connecting attachment flange 218 with surge tank 222. This allows first through fourth branching paths 228-1–228-4 to have uniform lengths.

This type of intake device for internal combustion engine is disclosed in Japanese laid-open patent publication number 5-180091, Japanese utility model publication number 2549543, and Japanese laid-open utility model publication number 5-21161.

In the disclosure in Japanese laid-open patent publication number 5-180091, the branching pipes are all grouped together and connected lengthwise to the surge tank. A contact section is disposed where the intake manifold attachment flange abuts the main engine unit. A chamber is disposed below the intake path of the contact section. A partitioning wall is disposed to partition the chamber into upper and lower divisions, and a communicating section is disposed to connect the two divisions. Communicating paths are disposed to connect the intake paths of each of the gas columns to one of the divisions, and an EGR path is disposed to send exhaust gas to the other chamber.

Referring to FIG. 15, the disclosure in Japanese utility model publication number 2549543 is roughly similar to what is shown in the figure. The path width of the curving intake pipes connected to the surge tank are roughly uniform. The cross-sections thereof are formed so that the curvature at the outside of the curve is greater than the curvature at the inside of the curve.

The cross-section shapes of the curving branches of the intake manifold are formed as ellipses so that their centroids are positioned closer toward the outside of the curves rather than at the centers of the intake pipes.

However, with the conventional intake devices of internal combustion engines, there are cases when the surge tank cannot be disposed at the center of the gas column row due to restrictions imposed by how the internal combustion engine is mounted in the automobile and the like.

Referring to FIG. 18, for example, in intake manifold 216 of intake device 212 a center C1 of surge tank 222 is offset by a distance M toward a third gas column #3 toward one side of gas column row direction D.

With manifold 216 having surge tank 222 offset in this manner, first through fourth branching pipes 220-1 through 220-4 are disposed so that the path lengths of first and second branching paths 228-1 and 228-2 of first and second branching pipes 220-1 and 220-2 are longer than the path lengths of third and fourth branching paths 228-3 and 228-4 of third and fourth branching pipes 220-3 and 220-4.

Thus, with this conventional intake device 212, the path lengths of first through fourth branching paths 228-1 through 228-4 cannot be made uniform. The non-uniformity results in variations in intake air flow through first through fourth gas columns #1 through #4. This reduces the output performance of internal combustion engine 202.

The path lengths of first through fourth branching paths 228-1 through 228-4 can be made uniform by having first and second branching pipes 220-1 and 220-2 formed with a larger curvature, resulting in a tighter curve, compared to third and fourth branching pipes 220-3 and 220-4.

Referring to FIGS. 19 and 20, compared to branching pipe 220, as shown in FIG. 19, formed with a small curvature resulting in a more gradual curve, branching pipe 220, as shown in FIG. 20, is formed with a larger curvature, resulting in a tighter curve. This leads to increased intake resistance due to the tighter curve in branching path 228. Thus, the output performance of the internal combustion engine is reduced.

OBJECTS AND SUMMARY OF THE INVENTION

It is an object of the present invention to provide an intake device for an internal combustion engine which overcome the foregoing problems It is a further object of the present invention to provide an intake device for an internal combustion engine which allows the length of the branching paths to be uniform, thereby improving output performance.

It is another object of the present invention to provide an intake device for an internal combustion engine which has smooth branching parts, thereby reducing intake resistance.

It is yet a further object of the present invention to provide an intake device for an internal combustion engine which has a more compact and lightweight design, thereby reducing fuel consumption, improving power performance, improving the ease of mounting in an automobile, and making the automobile lighter.

Briefly stated, the present invention provides a branching pipes connecting a surge tank to an intake manifold of an internal combustion engine. The branching pipes are made such that each gas column of the internal combustion receives a uniform intake volume. This is achieved by either making each branching pipe of the same length, or by adjusting the inside diameters of the branching pipes, thereby creating a flow delay of the intake into the gas columns, resulting in uniform intake volume. The inside diameters of the branching pipes are either made uniformly of a different diameter, or, alternatively, the inside diameters of the branching pipes include throttles for reducing the diameter of the branching pipe at a localized portion. In both cases, a flow delay of the intake into the gas columns is compensated, resulting in a uniform intake volume. The branching pipes of the present invention result in an improved output performance for the internal combustion engine; provide for smooth branching paths; reduce intake resistance; allow the intake manifold to be made compact and light; reduce fuel consumption; improve power performance; allow the internal combustion engine to be made compact; allow easier mounting in automobiles; and allow automobiles to be lighter.

According to an embodiment of the present invention, there is provided an intake device for an internal combustion engine comprising: attachment means for attaching the intake device to an intake manifold having at least first and second gas columns on the internal combustion engine; at least first and second branching pipes, each connecting one of the at least first and second gas columns to a surge tank; the surge tank having a center positioned a prescribed distance from a center of the at least first and second gas columns; and the at least first and second branching pipes connecting to the surge tank such that first and second branching pipes, corresponding to first and second gas columns having consecutive intake timings, connect, facing each other, at opposite sides of the surge tank.

According to a feature of the present invention, there is provided an intake device for an internal combustion engine comprising: attachment means for attaching the intake device to an intake manifold, having at least first and second gas columns, on the internal combustion engine; at least first and second branching pipes, each connecting one of the at least first and second gas columns to a surge tank; the surge tank having a center positioned a prescribed distance from a center of the at least first and second gas columns; the at least first and second branching pipes having a corresponding at least first and second inside diameters; the first branching pipe, having a shorter path length than the second branching pipe, has a larger diameter than a diameter of the second branching pipe, whereby a flow delay of the intake into the at least first and second gas columns is compensated, resulting in a uniform intake volume; and the at least first and second branching pipes connecting to the surge tank such that first and second branching pipes, corresponding to first and second gas columns having consecutive intake timings, connect, facing each other, at opposite sides of the surge tank.

According to a further feature of the present invention, there is provided an intake device for an internal combustion engine comprising: attachment means for attaching the intake device to an intake manifold having at least first and second gas columns on the internal combustion engine; at least first and second branching pipes, each connecting one of the at least first and second gas columns to a surge tank; the surge tank having a center positioned a prescribed distance from a center of the at least first and second gas columns; the first branching pipe, having a longer path length than the second branching pipe, has a throttle projecting from an inside wall of the first branching pipe, whereby a flow delay of the intake into the at least first and second gas columns is compensated, resulting in a uniform intake volume; and the at least first and second branching pipes connecting to the surge tank such that first and second branching pipes, corresponding to first and second gas columns having consecutive intake timings, connect, facing each other, at opposite sides of the surge tank.

In the present invention, there is an intake manifold that includes an attachment flange attached to an internal combustion engine. A plurality of branching pipes, corresponding to a plurality of gas columns, are arranged in a row on the internal combustion engine. A surge tank restricts intake gas rippling. The gas columns are attached to side walls of the surge tank, which are perpendicular to a gas column row direction, so that the branching pipes corresponding to gas columns having consecutive intake timings are connected facing each other along the gas column row direction.

In each of the plurality of branching pipes, one end is connected to the attachment flange to form a row along the gas column row direction. The other ends of the branching pipes, connected to the attachment flange to one side of a gas column row center of the plurality of gas columns, and other ends of branching pipes, connected to the attachment flange to another side of the gas column row center, are connected to side walls of the surge tank, perpendicular to the gas column row direction, so that the pipes face each other in an asymmetrical manner along the gas column row direction. The plurality of branching pipes is formed so that branching paths are uniformly long. The plurality of branching pipes is preferably formed from a plate material shaped in the form of pipes with a gradual curve having a small curvature. One end of the plurality of branching pipes is connected to the attachment flange. The other end is connected to the surge tank, which is offset to either side of a gas column row center of the plurality of gas columns along the gas column row direction.

In the intake device for internal combustion engines according to the present invention, the surge tank has side walls that face perpendicular to the gas column row direction. Branching pipes, corresponding to the gas columns having sequential intake timings, are connected to these side walls so that they face each other along the gas column row direction. The other ends of the branching pipes, connected to the attachment flange at one side of the gas column row center along the gas column row direction and the other ends of the branching pipes connected to the attachment flange at the other side of the gas column row center along the gas column row direction, are connected to the side walls of the surge tank so that they face each other and are asymmetrical. The branching paths are preferably formed to have uniform lengths, being preferably formed of plate materials in the shape of pipes. The pipes are formed with gradual curves having small curvatures. One end of each of the pipes is connected to the attachment flange, and the other end is connected to the surge tank, which is offset along the gas column row direction to one side or the other of the gas column center of the plurality of gas columns.

With this intake device, the branching pipes are formed from plate materials that is easily shaped. This allows the branching pipes to be formed so that the branching paths have uniform lengths. As a result, the branching paths are easily formed with uniform lengths, even if the surge tank is offset along the gas column row direction. The branching pipes, which are formed so that the branching paths have uniform lengths, are connected facing each other so that they are asymmetrical along the gas column row direction. Branching pipes corresponding to gas columns that have consecutive intake timings are connected facing each other along the gas column row direction. This allows the branching pipes, whose branching paths have uniform lengths, to be formed having large curvatures without having tight curves. As a result, the projection of the branching pipes in the gas column row direction is kept small while the shapes of the branching paths are made smooth.

The above, and other objects, features and advantages of the present invention will become apparent from the following description read in conjunction with the accompanying drawings, in which like reference numerals designate the same elements.

DETAILED DESCRIPTION OF THE INVENTION

Figure 3:
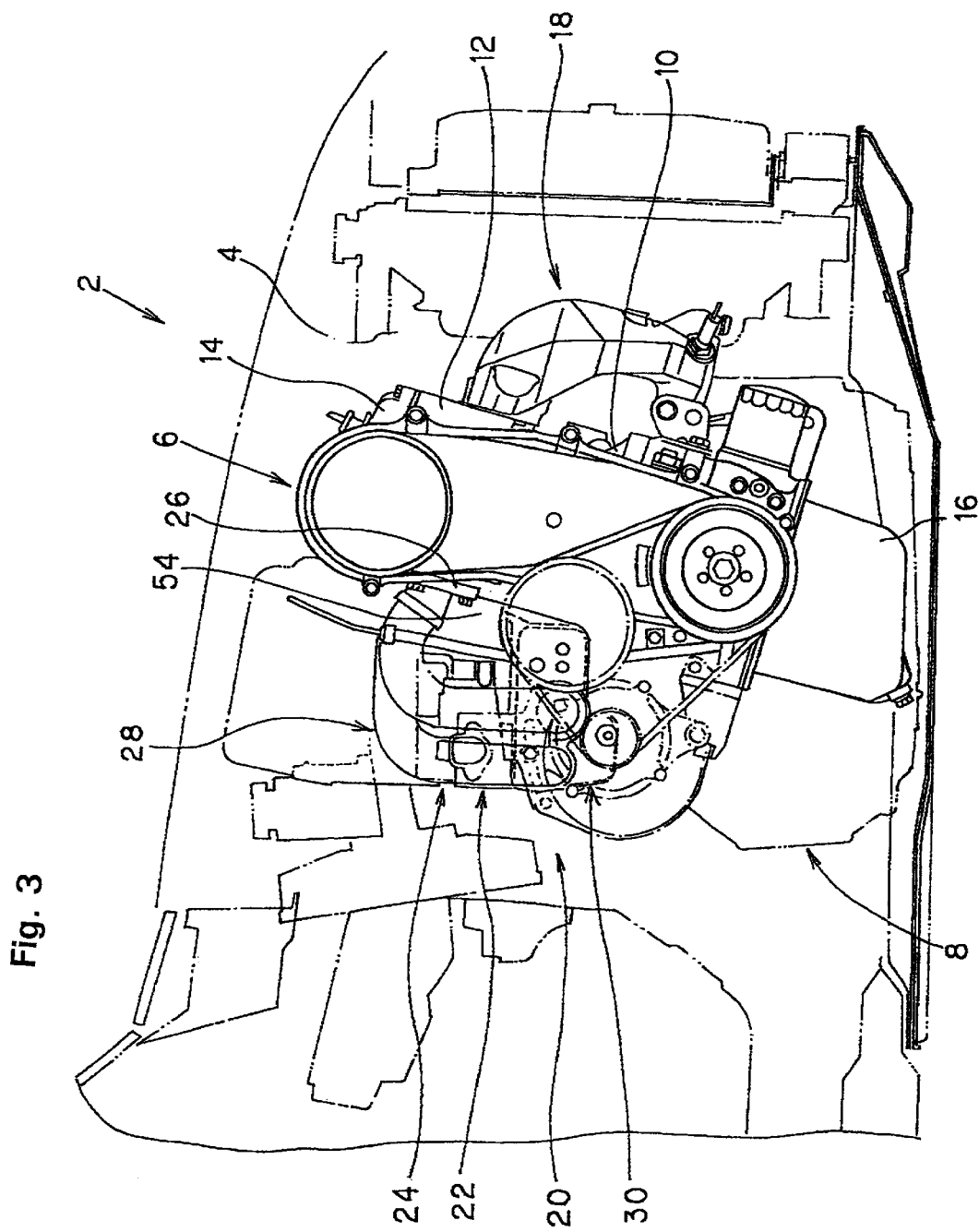
FIG. 3 is a side-view drawing of an internal combustion engine mounted in an automobile.

Referring to FIG. 3, an automobile 2 has an internal combustion engine 6 located in an engine compartment 4. A transmission gearbox 8 connects with internal combustion engine 6. Internal combustion engine 6 includes a cylinder block 10, a cylinder head 12, a head cover 14, and an oil pan 16.

A plurality of gas columns are arranged in a row, e.g., first through fourth gas columns #1–#4 (not shown in the figure). An exhaust manifold 18 is disposed on one side of cylinder head 12. An intake device 20 is disposed on the other side of cylinder head 12. The intake sequence of internal combustion engine 2 is the first gas column #1; the third gas column #3; the fourth gas column #4; and the second gas column #2.

An intake manifold 24 is disposed on a throttle body 22 which adjusts the intake volume using an internal throttle valve (not shown in the figure). Intake manifold 24 guides intake gas into the gas columns.

Figure 1:
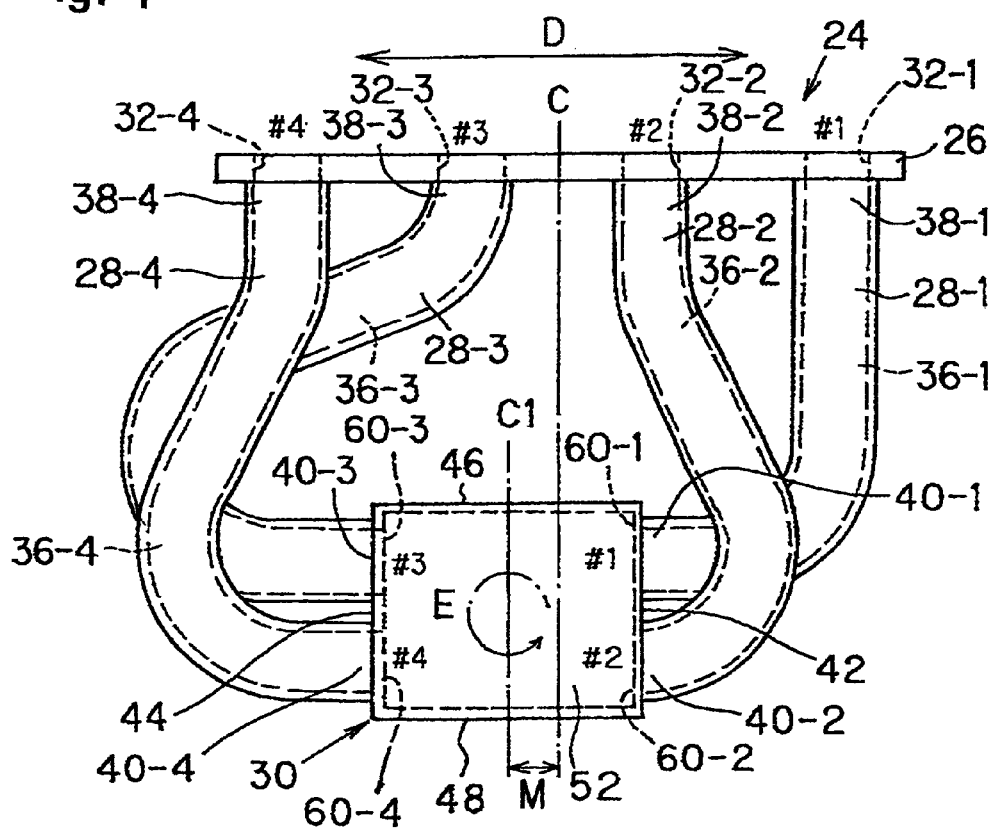
FIG. 1 is a plan drawing of an intake manifold of an intake device according to an embodiment of the present invention.
Figure 2:
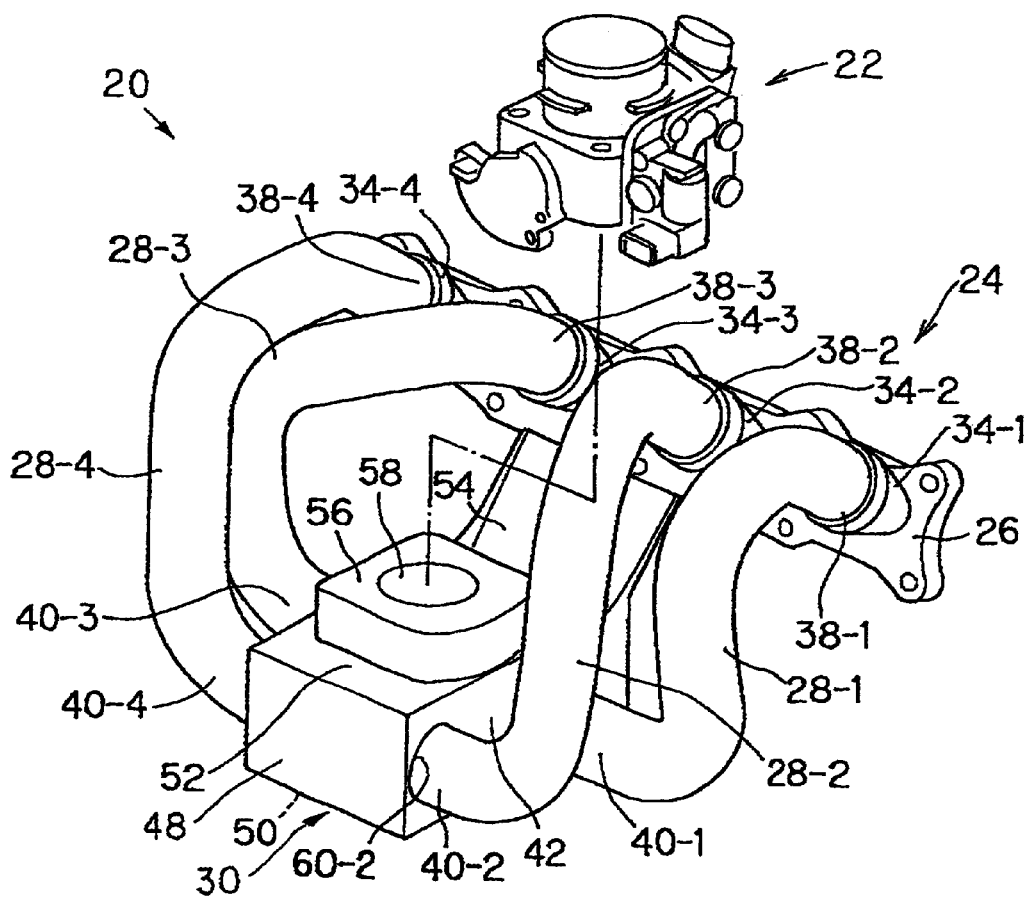
FIG. 2 is a perspective drawing of an intake manifold.

Referring to FIGS. 1 and 2, intake manifold 24 includes an attachment flange 26 attached to cylinder head 12. First through fourth branching pipes 28-1 through 28-4 correspond to first through the fourth gas columns #1 through #4. A surge tank 30 restricts intake gas ripples.

Attachment flange 26 is preferably formed as a rectangular plate oriented lengthwise along a gas column row direction D. Attachment flange 26 is formed with first through fourth flange openings 32-1 through 32-4 arranged in a row along gas column row direction D. First through fourth flange openings 32-1 through 32-4 communicate with first through fourth intake ports (not shown in the figure) of first through fourth gas columns #1 through #4. On the other side of attachment flange 26 are first through fourth side connectors 34-1 through 34-4, corresponding to first through fourth flange openings 32-1 through 32-4.

First through fourth branching pipes 28-1 through 28-4 are preferably formed from plates shaped as pipes having small curvatures, resulting in gentle curves. Inside first through fourth branching pipes 28-1 through 28-4 are first through fourth branching paths 36-1 through 36-4.

On first through fourth branching pipes 28-1 through 28-4 are disposed first through fourth flange fitting sections 38-1 through 38-4, which connect on one end to first through fourth flange side connectors 34-1 through 34-4 of attachment flange 26. On the other end are first through fourth tank fitting sections 40-1 through 40-4, which connect to first through fourth tank-side connecting openings 60-1 through 60-4, which are described later, of surge tank 30.

Surge tank 30 is preferably a hollow rectangle having side walls 42 and 44 facing either side of the gas column row direction D. A facing wall 46 and a rear wall 48 face toward and away from attachment flange 26. A bottom 50 is at the bottom of surge tank 30, and a ceiling 52 is at the top of surge tank 30.

Surge tank 30 is disposed so that a center C1 is offset from a gas column row center C by a distance M toward third gas column #3 at one side of gas column row direction D. A stay 54, formed as a curved plate, connects to attachment flange 26.

On ceiling 52 of surge tank 30 is a body attachment seat 56 to which attaches a throttle body 22. An air entry opening 58 on throttle body 22 attaches on a body attachment seat 56.

First and second tank-side connection openings 60-1 and 60-2 are on first side wall 42 of surge tank 30 facing one end of gas column row direction D. Third and fourth tank-side connection openings 60-3 and 60-4 are on second side wall 44 facing the other end of gas column row direction D.

First tank-side connection opening 60-1 is in the vicinity of attachment flange 26 of first side wall 42 of surge tank 30. Second tank-side connection opening 60-2 is away from attachment flange 26 on first side wall 42 of surge tank 30. Third tank-side connection opening 60-3 is in the vicinity of attachment flange 26 of second side wall 44 of surge tank 30. Fourth tank-side connection opening 60-4 is away from attachment flange 26 of second side wall 44 of surge tank 30. The curved line indicated by arrow E shows the intake sequence of first through fourth branching paths 36-1 through 36-4.

The following is a description of how the structure described above works.

Intake manifold 24 is on intake device 20 of internal combustion engine 2. Attachment flange 26 attaches to cylinder head 12. First through fourth branching pipes 28-1 through 28-4, corresponding to first through fourth gas columns #1 through #4, connect intake manifold 24 with surge tank 30, thereby restricting intake gas rippling.

Intake manifold 24 is disposed so that center C1 of surge tank 30 is offset by a distance M from gas column row center C toward third gas column #3 toward one side of gas column row direction D. Intake manifold 24, having surge tank 30 offset in this manner, results in path lengths of first and second branching paths 36-1 and 36-2 of first and second branching pipes 28-1 and 28-2 being longer than third and fourth branching paths 36-3 and 36-4 of third and fourth branching pipes 28-3 and 28-4. Therefore, first and second branching pipes 28-1 and 28-2 must be shortened.

Figure 4:
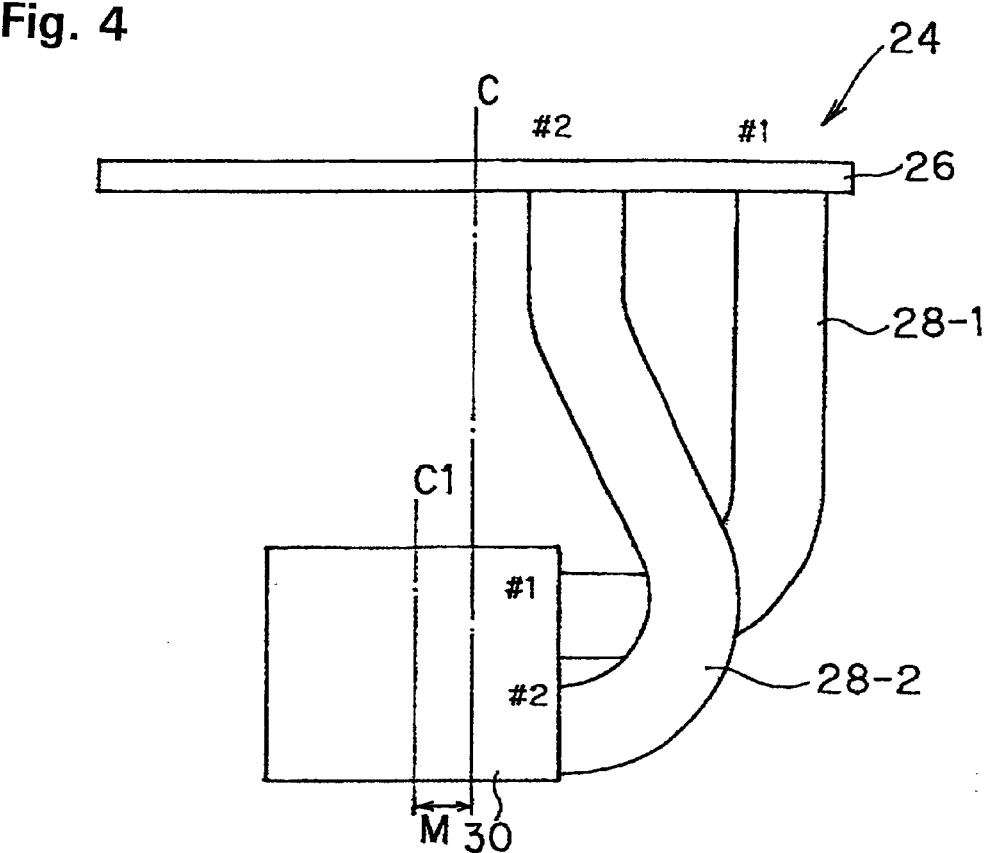
FIG. 4 is a plan drawing showing a first connection arrangement for the first and the second branching pipes to the surge tank.
Figure 5:
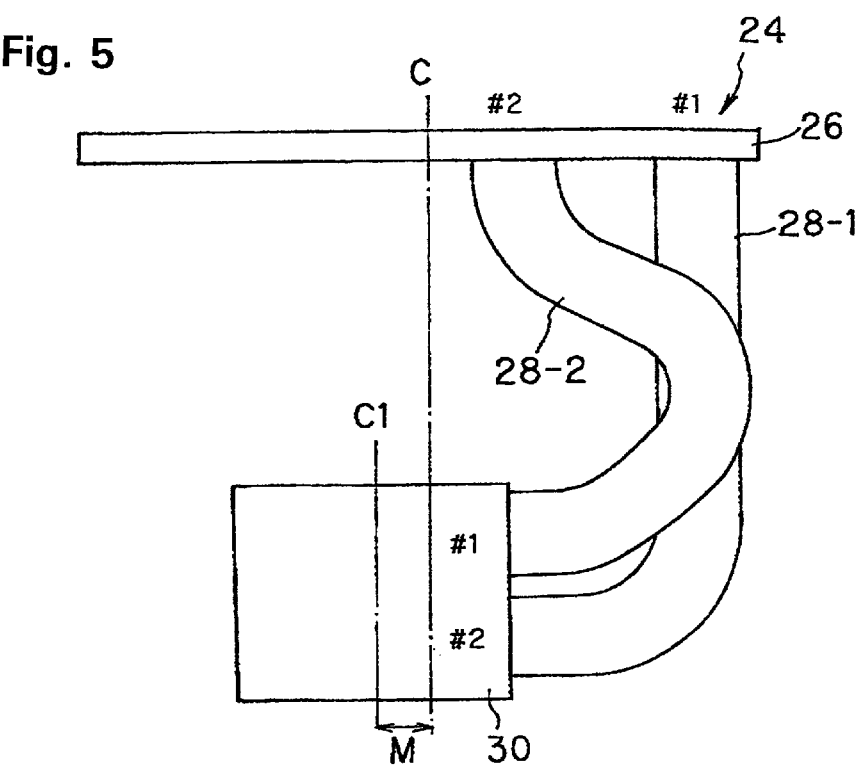
FIG. 5 is a plan drawing showing a second connection arrangement for the first and the second branching pipes to the surge tank.

When first and second branching pipes 28-1 and 28-2 are connected to surge tank 30, the connection arrangement shown in FIG. 5 will result, wherein first branching path 36-1 is too long compared to the connection arrangement shown in FIG. 4. This makes it difficult to form uniform lengths with third and fourth branching paths 36-3 and 36-4, as well as second branching path 36-2. Thus, for the connections between first and second branching pipes 28-1 and 28-2 and surge tank 30, the connection arrangement shown in FIG. 4 allows easier shortening of paths, thereby forming uniform lengths as compared to the connection arrangement shown in FIG. 5.

Figure 6:
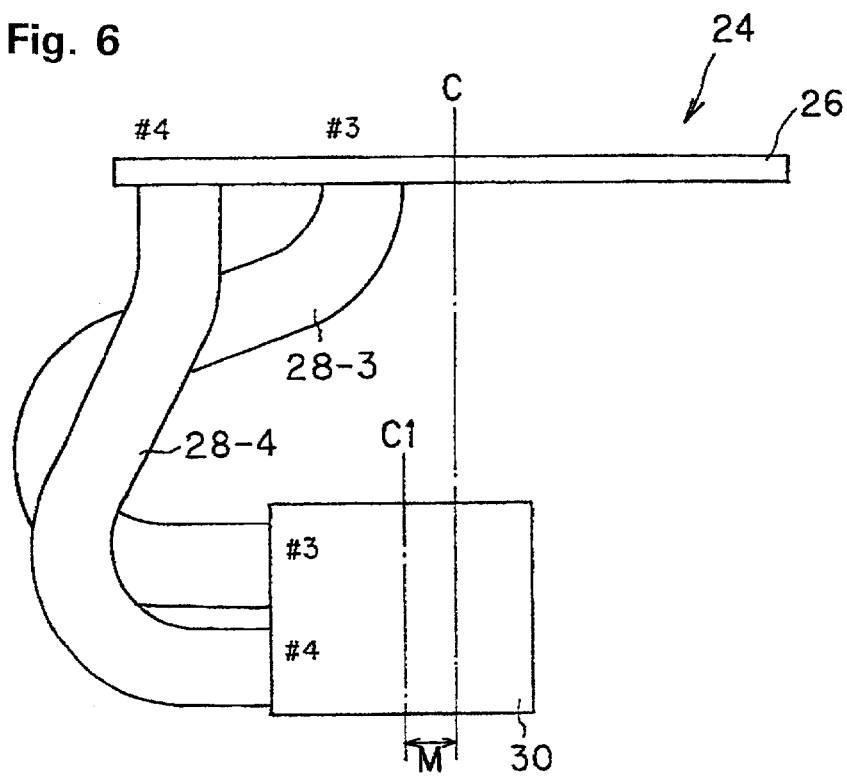
FIG. 6 is a plan drawing showing a first connection arrangement for the third and the fourth branching pipes to the surge tank.
Figure 7:
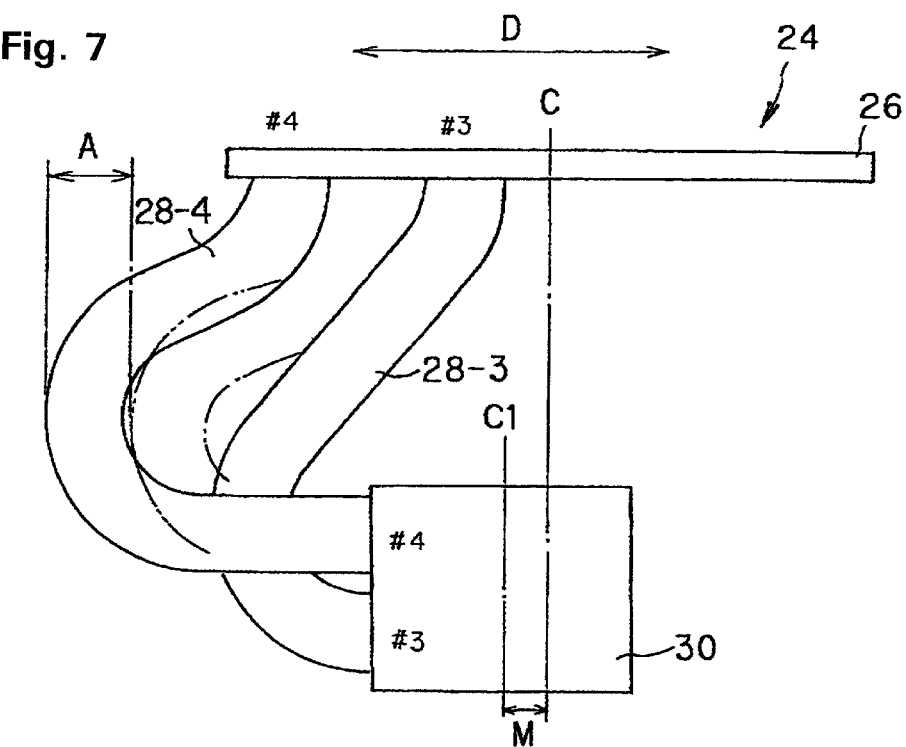
FIG. 7 is a plan drawing showing a second connection arrangement for the third and the fourth branching pipes to the surge tank.

When third and fourth branching pipes 28-3 and 28-4 are connected to surge tank 30, the connection arrangement shown in FIG. 7 will result, wherein fourth branching path 36-4 is too long compared to the connection arrangement shown in FIG. 6. Fourth branching pipe 28-4 will project by a distance A along gas column row direction D, resulting in a larger structure. Thus, when connecting third and fourth branching pipes 28-3 and 28-4 to surge tank 30, the connection arrangement shown in FIG. 6 will be more compact compared to the connection arrangement shown in FIG. 7.

By forming connections as shown in FIG. 4 and FIG. 6, intake device 20 allows the path lengths of first through fourth branching paths 36-1 through 36-4 to be made shorter and more uniform. Furthermore, the overall structure of the intake device 20 is made more compact.

Intake device 20 includes intake manifold 24, with attachment flange 26 connecting first through fourth branching pipes 28-1 through 28-4 with surge tank 30. Surge tank 30 is disposed so that its center C1 is offset toward third gas column #3 at one side of gas column row direction D. First through fourth branching pipes 28-1 through 28-4, which are preferably formed from plates shaped as pipes, are curved gradually having a small curvature. This shape allows first through fourth branching paths 36-1 through 36-4 to have uniform lengths.

First through fourth flange fitting sections 38-1 through 38-4, at one end of first through fourth branching pipes 28-1 through 28-4, are arranged in a row along gas column row direction D and connected to first through fourth flange-side connectors 34-1 through 34-4 of attachment flange 26. First through fourth tank fitting sections 40-1 through 40-4, on the other end of first through fourth branching pipes 28-1 through 28-4, connect to first through fourth tank-side connection openings 60-1 through 60-4 on side walls 42,44 of surge tank 30.

Surge tank 30, which is offset from gas column row center C toward third gas column #3 at one side of gas column row direction D, has side walls 42 and 44 facing either side of gas column row direction D. First and third branching pipes 28-1 and 28-3, corresponding to first and third gas columns #1 and #3, are consecutive in intake timing and connect to side walls 42 and 44 so that they face each other along gas column row direction D. Second and fourth branching pipes 28-2 and 28-4, corresponding to second and fourth gas columns #2 and #4, are also consecutive in intake timing and connected to side walls 42 and 44 so that they face each other along gas column row direction D.

First tank-side connection opening 60-1 of surge tank 30 is proximate to attachment flange 26 of first side wall 42. Second tank-side connection opening 60-2 of surge tank 30 is distal to attachment flange 26 on first side wall 42. Third tank-side connection opening 60-3 of surge tank 30 is proximate to attachment flange 26 on second side wall 44. Fourth tank-side connection opening 60-4 of surge tank 30 is distal to attachment flange 26 of second side wall 44.

As a result, first through fourth branching pipes 28-1 through 28-4 are arranged so that first and second tank-fitting sections 40-1 and 40-2, at the ends of first and second branching pipes 28-1 and 28-2, connect to side wall 42 of surge tank 30. Side walls 42 and 44 are perpendicular to gas column row direction D, in an asymmetrical manner. First and second tank-fitting sections 40-1 and 40-2 face third and fourth tank-fitting sections 40-3 and 40-4, which are at the ends of third and fourth branching pipes 28-3 and 28-4.

Third and fourth tank-fitting sections 40-3 and 40-4 attach to side wall 44 of surge tank 30.

First through fourth branching pipes 28-1 through 28-4 of intake device 20 are preferably formed of a plate material that is easily shaped. With such a material, first through fourth branching pipes 28-1 through 28-4 are formed so that first through fourth branching paths 36-1 through 36-4 have a uniform length. This allows first through fourth branching paths 36-1 through 36-4 to be easily formed with uniform lengths even if surge tank 30 is offset along gas column row direction D.

Furthermore, first through fourth branching pipes 28-1 through 28-4, which are formed with first through fourth branching paths 36-1 through 36-4 having uniform lengths, connect so that they face each other asymmetrically along gas column row direction D. First and third branching pipes 28-1 and 28-3, which correspond to first and third gas columns #1 and #3 and which have consecutive intake timings, are disposed facing each other along gas column row direction D. Second and fourth branching pipes 28-2 and 28-4, which correspond to second and fourth gas columns #2 and #4 and which have consecutive intake timings, are disposed facing each other along gas column row direction D. This structure allows first through fourth branching pipes 28-1 through 28-4, for which first through fourth branching paths 36-1 through 36-4 are formed with uniform lengths, to have gradual curves with small curvature, without requiring tight curves having large curvature. This allows the shape of first through fourth branching paths 36-1 through 36-4 to be smooth, while minimizing projection of first through fourth branching pipes 28-1 through 28-4 along gas column row direction D.

As a result, intake device 20 reduces variations in the output generated from first through fourth gas columns #1 through #4, since the path lengths of first through fourth intake paths 36-1 through 36-4 are uniform. This improves the output performance of internal combustion engine 6, reduces projections of first through fourth branching pipes 36-1 through 36-4 in the direction of gas column row direction D, allows smoother shapes for first through fourth branching paths 36-1 through 36-4 thereby reducing intake resistance, and allows intake manifold 24 to be lighter and more compact. By making intake manifold 24 lighter and more compact, fuel consumption is reduced, power performance is improved, and internal combustion engine 6 is made more compact. This makes it easy for internal combustion engine 6 to be mounted in automobile 2 while allowing automobile 2 to be lighter.

Referring specifically to FIG. 1, in this embodiment of the present invention, second branching pipe 28-2 is disposed above first branching pipe 28-1. Fourth branching pipe 28-4 is disposed above third branching pipe 28-3. However, it is also possible to have the pipes arranged as shown in FIGS. 8 through 11.

Figure 8:
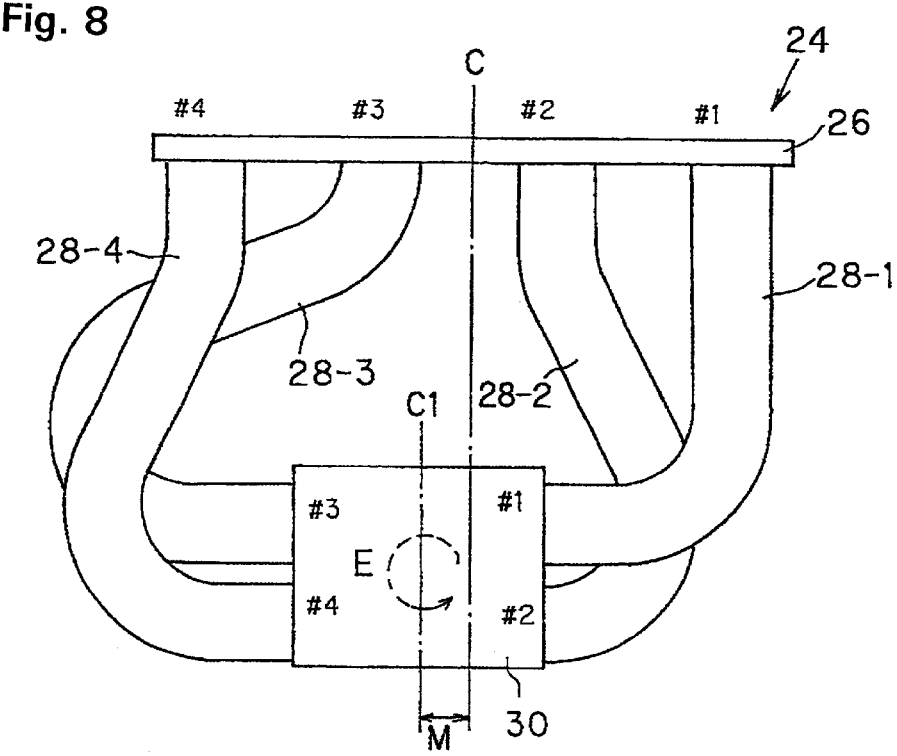
FIG. 8 is a plan drawing showing a first pipe arrangement of the first through the fourth branching pipes to the surge tank.

Referring to FIG. 8, in the pipe arrangement shown, first branching pipe 28-1 is above second branching pipe 28-2. Fourth branching pipe 28-4 is above third branching pipe 28-3.

Figure 9:
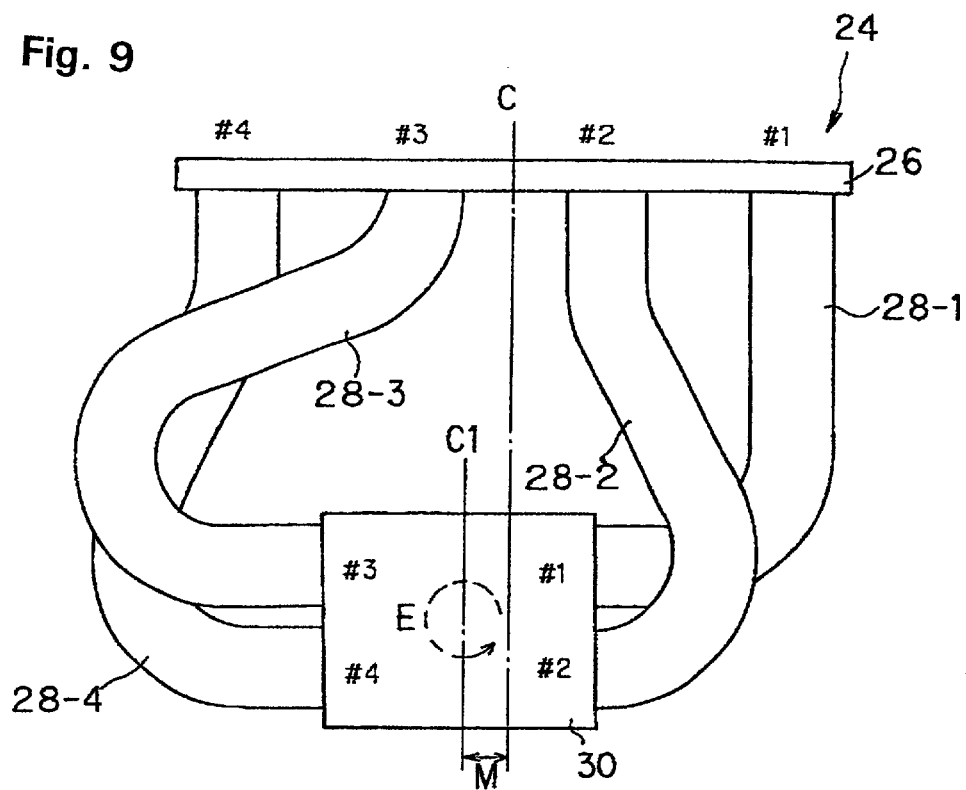
FIG. 9 is a plan drawing showing a second pipe arrangement of the first through the fourth branching pipes to the surge tank.

Referring to FIG. 9, in the pipe arrangement shown, second branching pipe 28-2 is above first branching pipe 28-1. Third branching pipe 28-3 is above fourth branching pipe 28-4.

Figure 10:
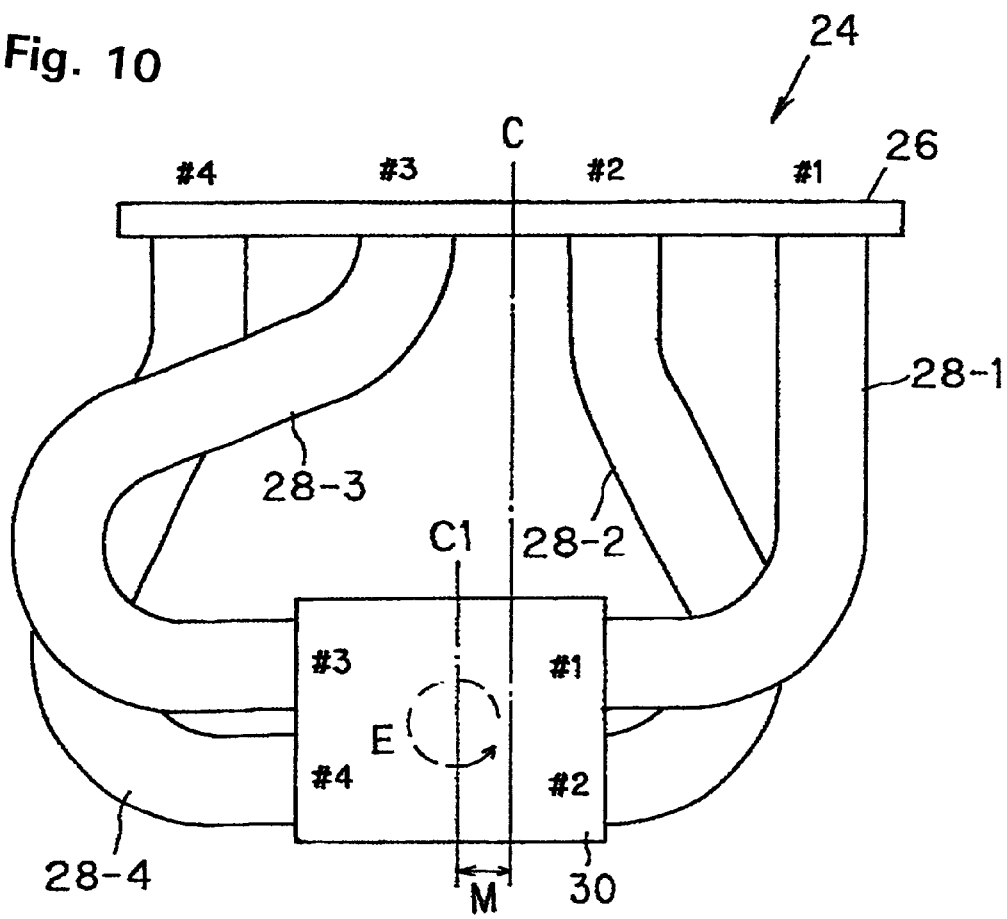
FIG. 10 is a plan drawing showing a third pipe arrangement of the first through the fourth branching pipes to the surge tank.

Referring to FIG. 10, in the pipe arrangement shown, first branching pipe 28-1 is above second branching pipe 28-2. Tthird branching pipe 28-3 is above fourth branching pipe 28-4.

The same advantages as the embodiment described above are provided, even if the relationship between first and second branching pipes 28-1 and 28-2, and the relationship between third and fourth branching pipes 28-3 and 28-4 are changed.

Referring back to FIG. 1, surge tank 30 is offset from gas column row center C toward third gas column #3 at one side of gas column row direction D. First through fourth branching pipes 28-1 through 28-4 connect to surge tank 30.

Figure 11:
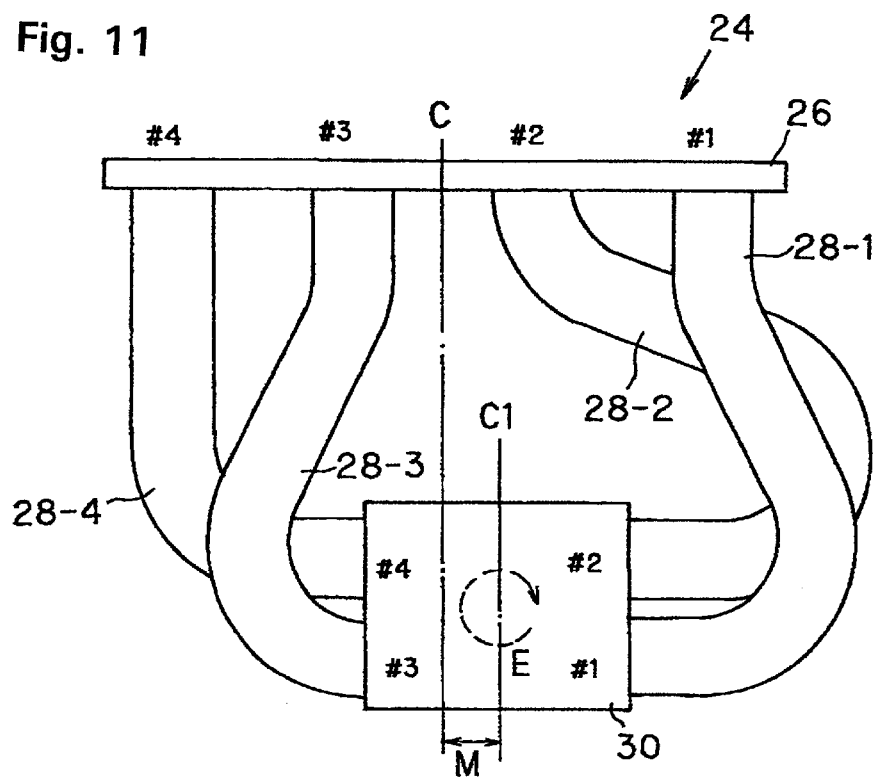
FIG. 11 is a plan drawing of an intake manifold where the surge tank is offset from the gas column row center toward the gas column along the gas column row direction.

Referring now to FIG. 11, similar advantages are obtained when surge tank 30 is offset from gas column row center C toward second gas column #2 at the other side of gas column row direction D. As in the first embodiment of the present invention, first through fourth branching pipes 28-1 through 28-4 connect to surge tank 30.

Figure 12:
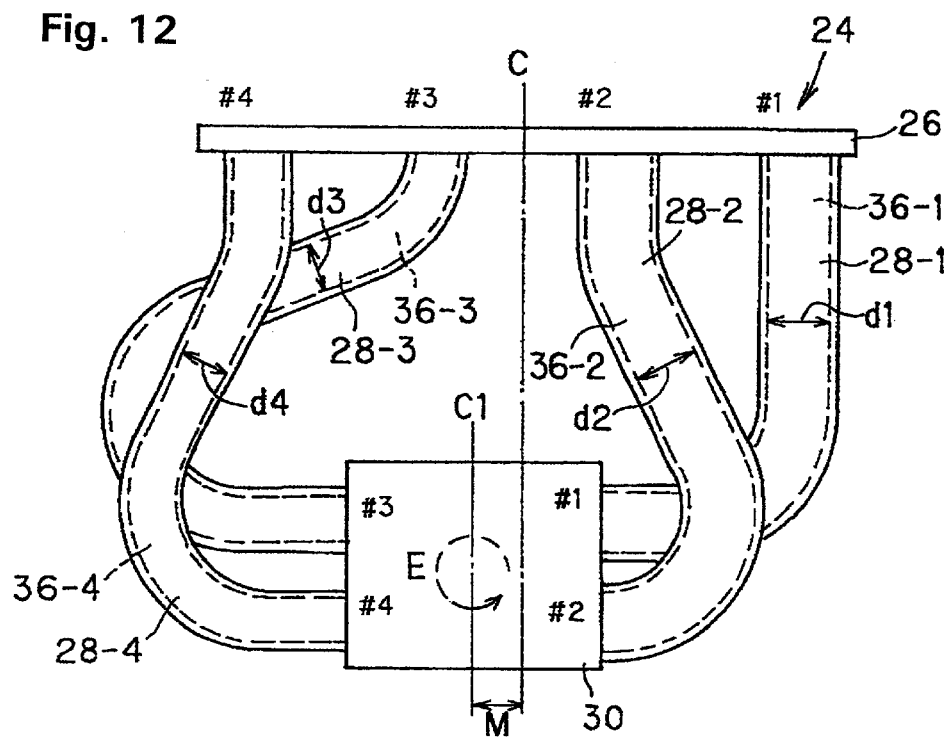
FIG. 12 is a plan drawing showing an intake manifold according to a first alternative embodiment.

Referring to FIG. 12, there is shown a first alternative embodiment of the present invention. Surge tank 30 is offset from gas column row center C toward third gas column #3 at one side of the gas column row direction. A first and second path diameter d1 and d2 of first and second branching paths 36-1 and 36-2 of first and second branching pipes 28-1 and 28-2 are larger than a third and fourth path diameters d3 and d4 of third and fourth branching paths 36-3 and 36-4 of third and fourth branching pipes 28-3 and 28-4, which have shorter path lengths.

First and second path diameters d1 and d2 of first and second branching paths 36-1 and 36-2, having shorter path lengths, are formed larger than third and fourth path diameters d3 and d4 of third and fourth branching paths 36-3 and 36-4, which have shorter path lengths. As a result, the flow delay of the intake air into first and second gas columns #1 and #2 is compensated, and the intake air volumes for first through fourth gas columns #1 through #4 are uniform.

By varying the first through the fourth path diameters d1–d4 based on the path lengths of the first through the fourth branching paths 36-1–36-4, the intake air volumes for the first through the fourth gas columns #1–#4 can be made uniform.

Figure 13:
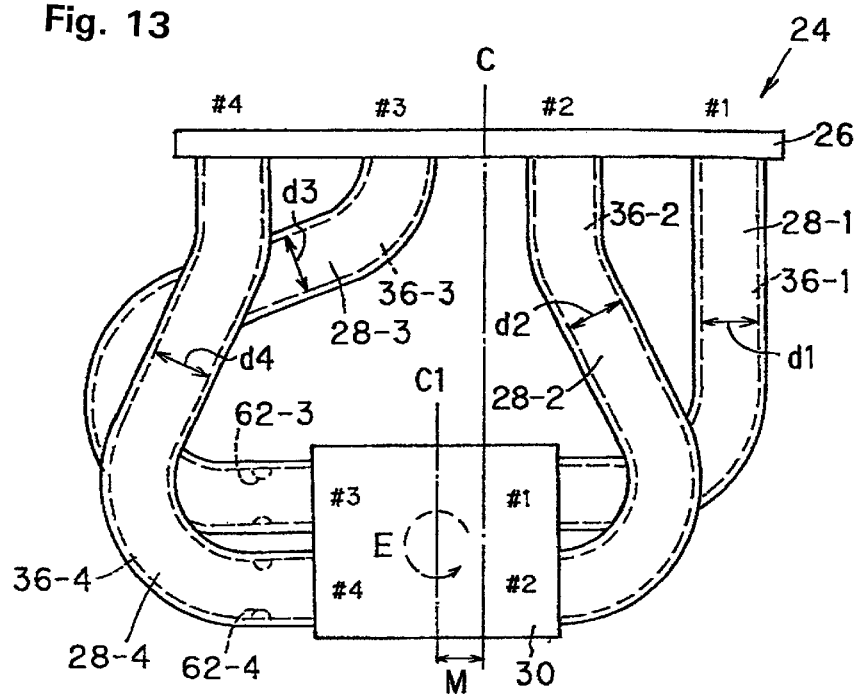
FIG. 13 is a plan drawing of an intake manifold according to a second alternative embodiment.

Referring to FIG. 13, there is shown a second alternative embodiment of the present invention. Surge tank 30 is offset from gas column row center C toward third gas column #3 at one side of the gas column row direction. A third and a fourth throttle 62-3 and 62-4 are on third and fourth path diameters d3 and d4 of third and fourth branching paths 36-3 and 36-4 of third and fourth branching pipes 28-3 and 28-4, which have longer path lengths compared to first and second path diameters d1 and d2 of first and second branching paths 36-1 and 36-2 of first and second branching pipes 28-1 and 28-2. Third and fourth throttles 62-3 and 62-4 serve to reduce third and fourth path diameters d3 and d4.

Third and fourth throttles 64-3 and 64-4 are on third and fourth branching paths 36-3 and 36-4, which have longer path lengths, in order to reduce third and fourth path diameters d3 and d4. First and second throttles 62-1 and 62-2 (not shown in the figure) are not disposed on first and second branching paths 36-1 and 36-2, which have shorter path lengths, in order to reduce first and second path diameters d1 and d2. This structure provides compensation for the intake air flow delay to first and second gas columns #1 and #2, allowing the intake air volumes at first through fourth gas columns #1 through #4 to be uniform.

First through fourth throttles 62-1 through 62-4 can be varied according to the path lengths of first through fourth branching paths 36-1 through 36-4, so that the intake air volume at first through fourth gas columns #1 through #4 are further equalized. Also, the intake resistance of the branching pipes is reduced and the intake air volumes is made uniform, by providing larger path diameters for the sections with gradual curves having small curvature, and by providing small path diameters for the sections with tight curves having large curvature.

In the internal combustion engine of the embodiments described above, first through fourth gas columns #1 through #4 are arranged in a row. However, it is also possible to implement the present invention for a V-type gas column internal combustion engine, with the intake manifolds attached to the cylinder banks on each side.

Figure 14:
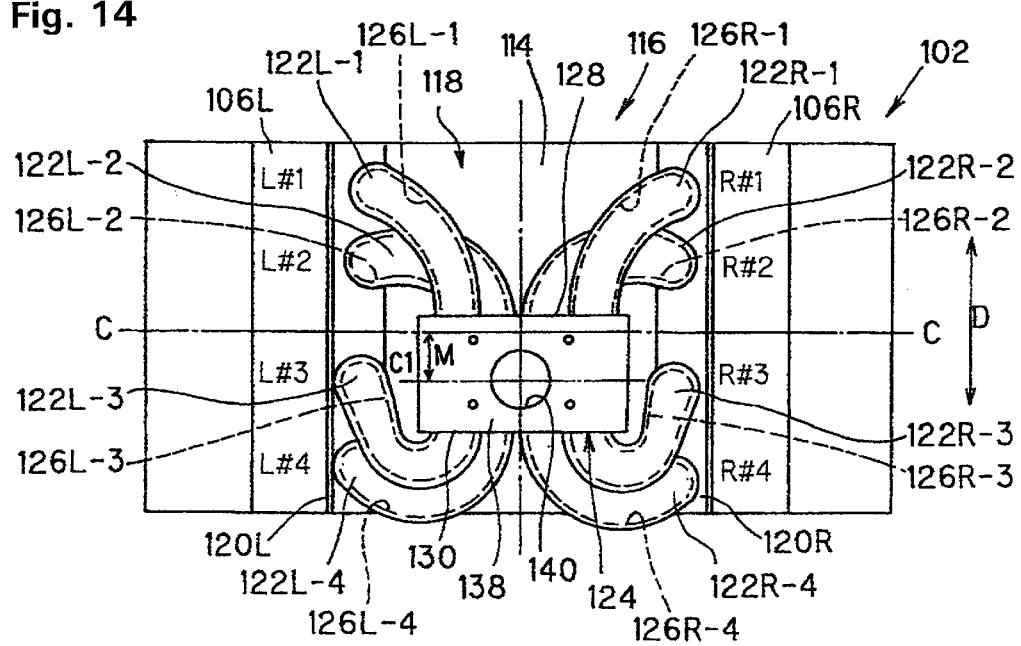
FIG. 14 is a schematic plan drawing of a sample implementation in an internal combustion engine of a V-8 gas column internal combustion engine.
Figure 15:
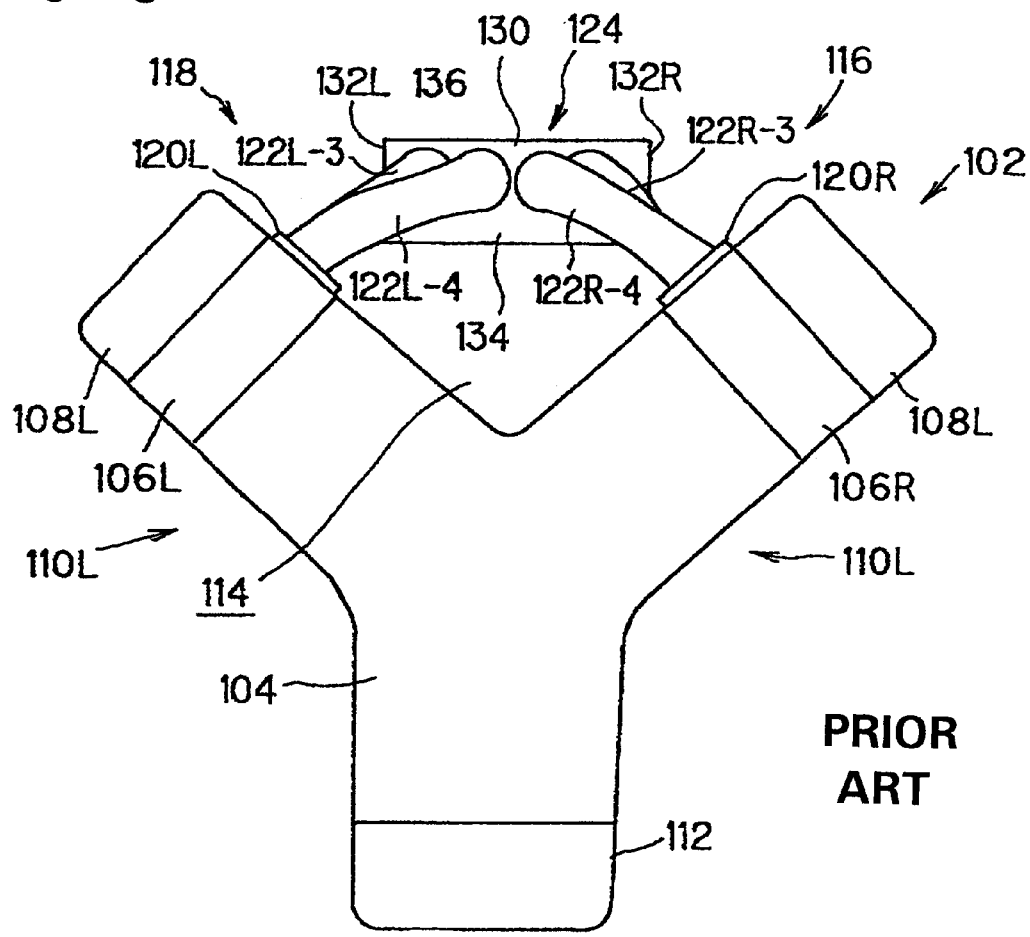
FIG. 15 is a schematic front-view drawing of a sample implementation in an internal combustion engine of a V-8 gas column internal combustion engine.
Figure 16:
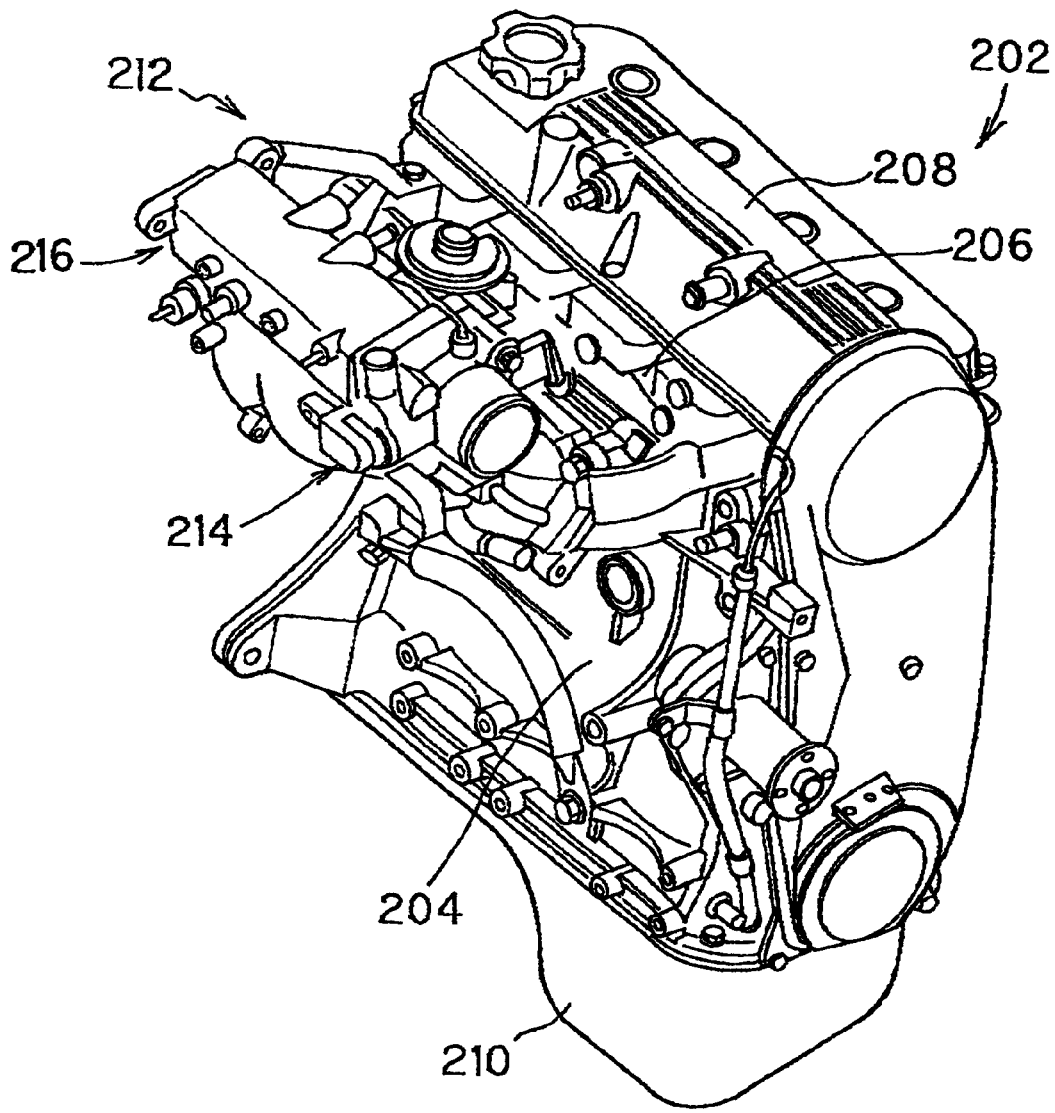
FIG. 16 is a perspective drawing of a conventional internal combustion engine.
Figure 17:
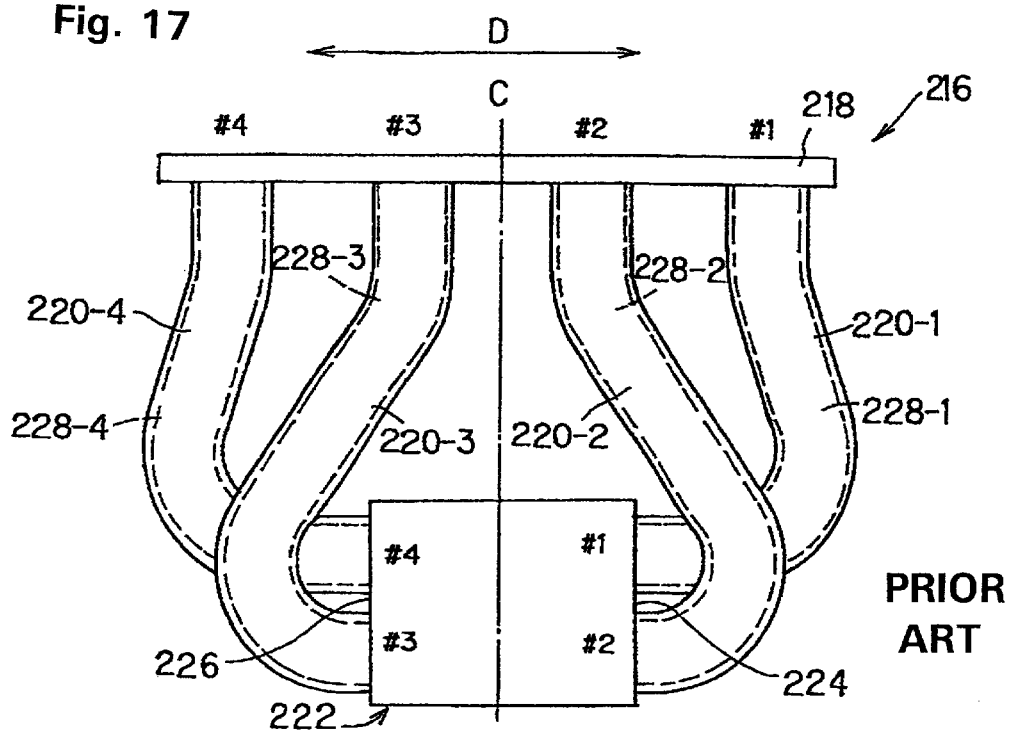
FIG. 17 is a plan drawing of an intake manifold where the surge tank is positioned at the gas column row center according to conventional technology.
Figure 18:
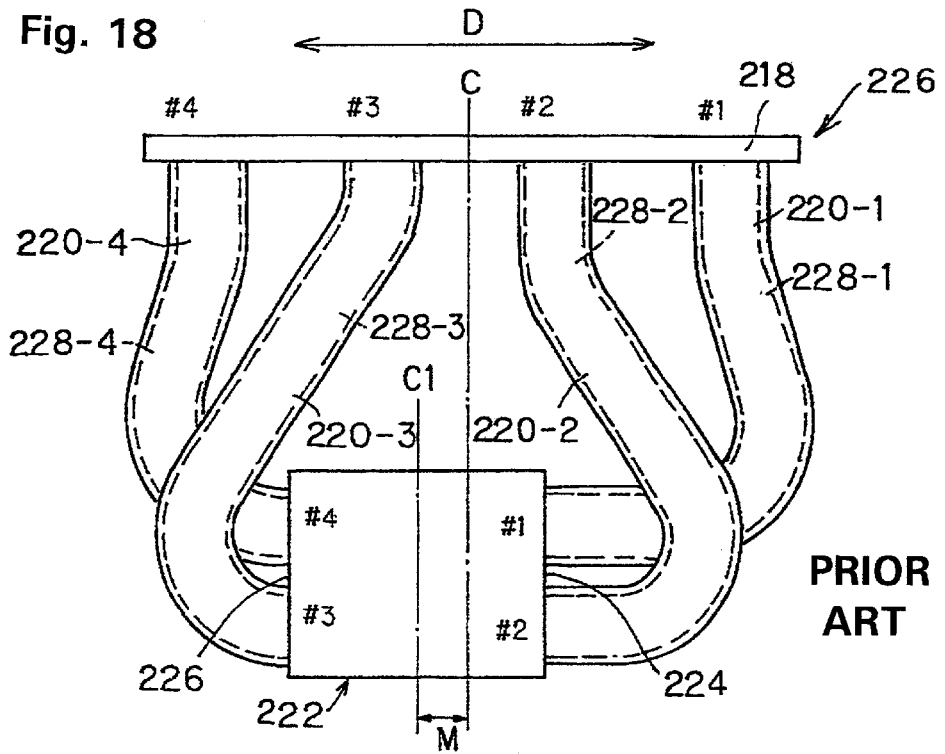
FIG. 18 is a plan drawing of an intake manifold where the surge tank is offset from the gas column row center toward the third gas column along the gas column row direction according to conventional technology.
Figure 19:
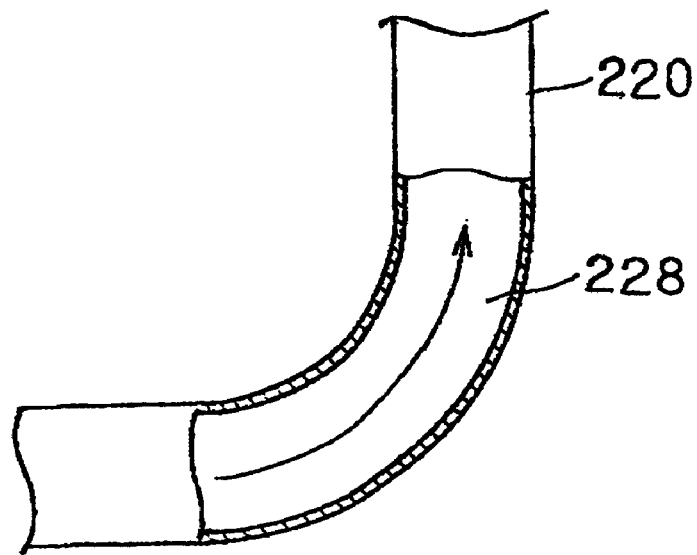
FIG. 19 is a partially cut-away plan drawing of a branching pipe that is gradually curved with a small curvature.
Figure 20:
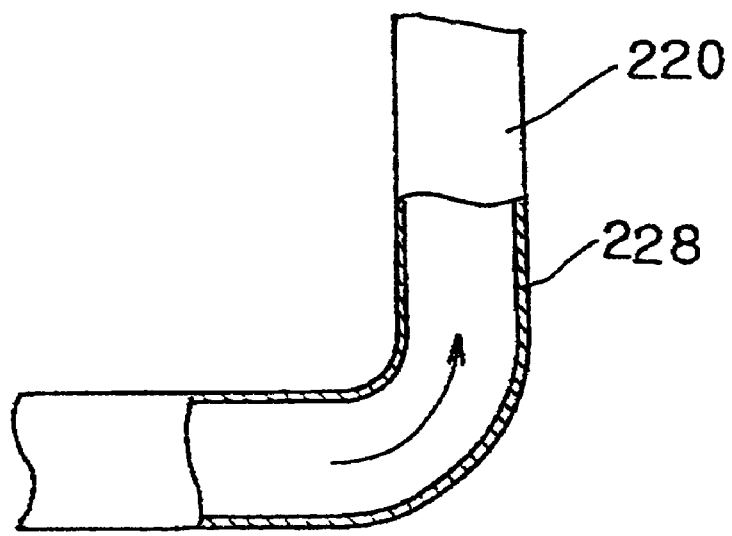
FIG. 20 is a partially cut-away plan drawing of a branching pipe that is tightly curved with a large curvature.

Referring to FIG. 14, there is shown a sample implementation of the present invention with a V-8 gas column internal combustion engine 102 mounted in an automotive engine compartment (not shown in the figure). Internal combustion engine 102 includes cylinder heads 106R and 106L and head covers 108R and 108L mounted over a roughly V-shaped cylinder block 104. Cylinder banks 110R and 110L are disposed in a V-shaped arrangement. An oil pan 112 is disposed below cylinder block 104.

Internal combustion engine 102 of the V-8 gas column can have, for example, four first-side first through fourth gas columns R#1 through R#4 (not shown in the figure) arranged in a row on first-side cylinder bank 110R. Also, on second-side cylinder bank 110L, four second-side first through fourth gas columns L#1 through L#4 (not shown in the figure) are arranged in a row.

In internal combustion engine 102, an intake device 116 is disposed in a bank space 114, between cylinder banks 110R and 110L. Intake device 116 includes an intake manifold 118 and a throttle body (not shown in the figure).

Intake manifold 118 includes first-side first through fourth branching pipes 122R-1 through 122R-4, which correspond to a first-side attachment flange 120R attached to a first-side cylinder head 106R and first-side first through fourth gas columns R#1 through R#4. Second-side first through fourth branching pipes 122L-1 through 122L-4, which correspond to a second-side attachment flange 120L, have second-side first through fourth gas columns L#5 through L#8. A surge tank 124 restricts intake gas rippling.

First-side first through fourth branching pipes 122R-1 through 122R-4, which are preferably formed from plates shaped as pipes, have gradual curves with small curvatures. First-side first through fourth branching pipes 122R-1 through 122R-4 are formed internally so that first-side first through fourth branching paths 126R-1 through 126R-4 have uniform lengths. Second-side first through fourth branching pipes 122L-1 through 122L-4, which are preferably formed from plates shaped as pipes, have gradual curves with small curvatures and are also formed internally so that first-side first through fourth branching paths 126L-1 through 126L-4 have uniform lengths.

Surge tank 124 is a hollow, roughly rectangular body including side walls 128 and 130 perpendicular to the ends of gas column row direction D. Side walls 132R and 132L face side attachment flanges 120R and 120L. A bottom 134 is at the bottom of surge tank 124. A ceiling 136 at the top of surge tank 124. A body attachment seat 138, for attaching a throttle body, is disposed on ceiling 136. An air entry opening 140 is disposed on body attachment seat 138 to allow air in from the throttle body.

Surge tank 124 is disposed so that its center C1 is at an offset of a distance M from gas column row center C toward third gas columns R#3 and L#3 of gas column row direction D.

First through fourth gas columns R#1 through R#4 and L#1 through L#4 (not shown in the figure) of internal combustion engine 102 are arranged as a row on each of cylinder banks 110R and 110L, respectively. First through fourth branching pipes 122R-1 through 122R-4 and 122L-1 through 122L-4 of intake device 116 connect symmetrically to surge tank 124.

The following will describe how first through fourth branching pipes 122R-1 through 122R-4, which communicate with first through fourth gas cylinders R#1 through R#4 of cylinder bank 110R, are connected.

One end of first through fourth branching pipes 122R-1 through 122R-4 connect to first-side attachment flange 120R. The other end of first and second branching pipes 122R-1 and 122R-2 connect to first side wall 128 of surge tank 124, facing one end of gas cylinder direction D. The other end of third and fourth branching pipes 122R-3 and 122R-4 connect to second side wall 128 of surge tank 124, facing the other end of gas cylinder direction D.

With these first through fourth branching pipes 122R-1 through 122R-4, first and third branching pipes 122R-1 and 122R-3, which correspond to first and third gas columns R#1 and R#3 and which have consecutive intake timings, connect to side walls 128 and 130 of surge tank 124 so that they face each other along gas column row direction D. Second and fourth branching pipes 122R-2 and 122R-4, which correspond to second and fourth gas columns R#2 and R#4 and which have consecutive intake timings, connect to side walls 128 and 130 so that they face each other along gas column row direction D.

Also, with these first through fourth branching pipes 122R-1 through 122R-4, the other ends of first and second branching pipes 122R-1 and 122R-2, which connect to attachment flange 120R to one side of gas column row center C along gas column row direction D, and the other ends of third and fourth branching pipes 122R-3 and 122R-4, which connect to attachment flange 120R to the other side of gas column row center C along gas column row direction D, connect to side walls 128 and 130, so that they are asymmetrical along gas column row direction D.

Thus, in intake device 116, first through fourth branching pipes 122R-1 throgh 122R-4, which communicate with first through fourth gas columns R#1 through R#4, are preferably formed with easily shaped plate material. As a result, first through fourth branching pipes 122R-1 through 122R-4 are formed so that the lengths of first through fourth branching paths 126R-1 through 126R-4 are uniform. Thus, even if surge tank 124 is offset along gas column row direction D, first through fourth branching paths 126R-1 through 126R-4 are easily made with uniform lengths.

Furthermore, in intake device 116, first through fourth branching pipes 122R-1 through 122R-4 connect facing each other so that they are asymmetrical along gas column row direction D. First and third branching pipes 122R-1 and 122R-3, which correspond to first and third gas columns R#1 and R#3 and which have consecutive intake timings, connect facing each other along gas column row direction D. Likewise, second and fourth branching pipes 122R-2 and 122R-4, which correspond to second and fourth gas columns R#2 and R#4 and which have consecutive intake timings, connect facing each other along gas column row direction D. As a result, first through fourth branching pipes 122R-1 through 122R-4, which have uniform lengths for first through fourth branching paths 126R-1 through 126R-4, are formed with gradual curves having small curvatures rather than with tight curves having large curvatures. Thus, the projections of first through fourth branching pipes 122R-1 through 122R-4, along gas column row direction D, is kept small while the shapes of first through fourth branching paths 126R-1 through 126R-4 are kept smooth.

As a result, in intake device 116 of V-8 gas cylinder internal combustion engine 102, first through fourth branching paths 126R-1 through 126R-4 have uniform lengths. Thus, variations in the output generated from first through fourth gas cylinder R#1 through R#4 is reduced, the output performance of internal combustion engine 102 is improved, the projection along gas cylinder row direction D of first through fourth branching pipes 122R-1 through 122R-4 is minimized, the shapes of first through fourth branching paths 126R-1 through 126R-4 are made smooth thereby reducing intake resistance, and intake manifold 118 is made lighter and more compact. The lighter and more compact intake manifold 118 reduces fuel consumption and improves power performance, while allowing internal combustion engine 102 to be more compact. This further allows internal combustion engine 102 to be more easily mounted in an automobile, resulting in the automobile being lighter.

First through fourth branching pipes 122L-1 through 122L-4, which communicate with first through fourth gas columns L#1 through L#4 of cylinder bank 110L of internal combustion engine 102, are symmetrical with first through fourth branching pipes 122R-1 through 122R-4 described above. By forming first through fourth branching pipes 122L-1 through 122L-4 in a similar manner as first through fourth branching pipes 122R-1 through 122R-4 described above, they are connected with a similar connection arrangement to surge tank 124.

Thus, in intake device 116, first through fourth branching pipes 122L-1 through 122L-4, which communicate with first through fourth gas cylinder L#1 through L#4 of cylinder bank 110L of internal combustion engine 102, are formed similar to first through fourth branching pipes 122R-1 through 122R-4 as described above. First through fourth branching pipes 122L-1 through 122L-4 are formed so that first through fourth branching paths 126L-1 through 126L-4 have uniform lengths. Thus, even if surge tank 124 is offset along gas column row direction D, first through fourth branching paths 126L-1 through 126L-4 are easily made with uniform lengths. First through fourth branching pipes 122L-1 through 122L-4, which have uniform lengths for first through fourth branching paths 126L-1 through 126L-4, are formed with gradual curves having small curvatures rather than with tight curves having large curvatures. Thus, the projections of first through fourth branching pipes 122L-1 through 122L-4, along gas column row direction D, is kept small while the shapes of first through fourth branching paths 126L-1 through 126L-4 are kept smooth.

As a result, in intake device 116 of V-8 gas cylinder internal combustion engine 102, first through fourth branching paths 126L-1 through 126L-4 have uniform lengths. Thus, variations in the output generated from first through fourth gas cylinder L#1 through L#4 is reduced, the output performance of internal combustion engine 102 is improved, the projection along gas cylinder row direction D of first through fourth branching pipes 122L-1 through 122L-4 is minimized, the shapes of first through fourth branching paths 126L-1 through 126L-4 are made smooth thereby reducing intake resistance, and intake manifold 118 is made lighter and more compact. The lighter and more compact intake manifold 118 reduces fuel consumption and improves power performance, while allowing internal combustion engine 102 to be more compact. This allows internal combustion engine 102 to be more easily mounted in an automobile, resulting in the automobile being lighter.

As described above, the intake device for internal combustion engines according to the present invention allows branching pipes to be formed so that their branching paths have uniform lengths. Even if the surge tank is offset along the gas column row direction, the branching paths are easily be formed with uniform lengths. Also, the branching pipes, having uniformly long branching paths, are formed without forming tight curves having large curvatures. The projection of the branching pipes, in the direction of the branching pipe row direction, is kept small, and the shapes of the branching pipes are kept smooth.

As a result, this intake device for internal combustion engines reduces variations in the power generated by the gas columns through the uniform lengths of the intake paths. The output performance of the internal combustion engine is improved. The projection of the branching pipes in the gas column row direction is kept small. The branching paths are kept smooth, thereby reducing intake resistance. The intake manifold is made compact and light. The compactness and lightness of the intake manifold allows fuel consumption to be reduced and improves overall power performance. This allows the internal combustion engine to be made more compact, resulting in the internal combustion engine being more easily mounted in an automobile, allowing the automobile to be lighter.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An intake device for an internal combustion engine comprising:

attachment means for attaching said intake device to an intake manifold having at least first and second gas columns on said internal combustion engine;

at least first and second branching pipes, each connecting one of said at least first and second gas columns to a surge tank;

said surge tank having a center positioned a prescribed distance from a center of said at least first and second gas columns; and said at least first and second branching pipes connecting to said surge tank such that first and second branching pipes, corresponding to first and second gas columns having consecutive intake timings, connect, facing each other, at opposite sides of said surge tank.

2. An intake device for an internal combustion engine according to claim 1, wherein:

said at least first and second branching pipes connect to side walls of said surge tank; and said side walls being substantially perpendicular to said intake manifold.

3. An intake device for an internal combustion engine according to claim 1, wherein said attachment means includes an attachment flange capable of attaching said at least first and second branching pipes to their corresponding said at least first and second gas columns of said intake manifold.

4. An intake device for an internal combustion engine according to claim 1, wherein:

said at least first and second branching pipes define corresponding at least first and second branching paths; and said at least first and second branching paths each having substantially the same length.

5. An intake device for an internal combustion engine according to claim 1, wherein each of said at least first and second branching pipes are formed with gradual curves, whereby intake restriction is minimized.

6. An intake device for an internal combustion engine according to claim 1, wherein:

said internal combustion engine is a V-type internal combustion engine;

said intake device includes first and second intake devices; and said first intake device attaching to a first side of said V-type internal combustion engine and said second intake device attaching to a second side of said V-type internal combustion engine.

7. An intake device for an internal combustion engine comprising:

attachment means for attaching said intake device to an intake manifold, having at least first and second gas columns, on said internal combustion engine;

at least first and second branching pipes, each connecting one of said at least first and second gas columns to a surge tank;

said surge tank having a center positioned a prescribed distance from a center of said at least first and second gas columns;

said at least first and second branching pipes having a corresponding at least first and second inside diameters;

said first branching pipe, having a shorter path length than said second branching pipe, has a larger diameter than a diameter of said second branching pipe, whereby a flow delay of the intake into said at least first and second gas columns is compensated, resulting in a uniform intake volume; and said at least first and second branching pipes connecting to said surge tank such that first and second branching pipes, corresponding to first and second gas columns having consecutive intake timings, connect, facing each other, at opposite sides of said surge tank.

8. An intake device for an internal combustion engine according to claim 7, wherein:

said at least first and second branching pipes connect to side walls of said surge tank; and said side walls being substantially perpendicular to said intake manifold.

9. An intake device for an internal combustion engine according to claim 7, wherein said attachment means includes an attachment flange capable of attaching said at least first and second branching pipes to their corresponding said at least first and second gas columns of said intake manifold.

10. An intake device for an internal combustion engine according to claim 7, wherein each of said at least first and second branching pipes are formed with gradual curves, whereby intake restriction is minimized.

11. An intake device for an internal combustion engine according to claim 7, wherein:

said internal combustion engine is a V-type internal combustion engine;

said intake device includes first and second intake devices; and said first intake device attaching to a first side of said V-type internal combustion engine and said second intake device attaching to a second side of said V-type internal combustion engine.

12. An intake device for an internal combustion engine comprising:

attachment means for attaching said intake device to an intake manifold having at least first and second gas columns on said internal combustion engine;

at least first and second branching pipes, each connecting one of said at least first and second gas columns to a surge tank;

said surge tank having a center positioned a prescribed distance from a center of said at least first and second gas columns;

said first branching pipe, having a longer path length than said second branching pipe, has a throttle projecting from an inside wall of said first branching pipe, whereby a flow delay of the intake into said at least first and second gas columns is compensated, resulting in a uniform intake volume; and said at least first and second branching pipes connecting to said surge tank such that first and second branching pipes, corresponding to first and second gas columns having consecutive intake timings, connect, facing each other, at opposite sides of said surge tank.

13. An intake device for an internal combustion engine according to claim 12, wherein:

said at least first and second branching pipes connect to side walls of said surge tank; and said side walls being substantially perpendicular to said intake manifold.

14. An intake device for an internal combustion engine according to claim 12, wherein said attachment means includes an attachment flange capable of attaching said at least first and second branching pipes to their corresponding said at least first and second gas columns of said intake manifold.

15. An intake device for an internal combustion engine according to claim 12, wherein each of said at least first and second branching pipes are formed with gradual curves, whereby intake restriction is minimized.

16. An intake device for an internal combustion engine according to claim 12, wherein:

said internal combustion engine is a V-type internal combustion engine;

said intake device includes first and second intake devices; and said first intake device attaching to a first side of said V-type internal combustion engine and said second intake device attaching to a second side of said V-type internal combustion engine.

* * * * *